United States Patent
King

(10) Patent No.: US 6,497,067 B1
(45) Date of Patent: Dec. 24, 2002

(54) PIER REEL HOLDER

(76) Inventor: Rickey M. King, 2103 Crawford Pl., Mobile, AL (US) 36617

( * ) Notice: Subject to any disclaimer, the term of this patent is extended or adjusted under 35 U.S.C. 154(b) by 0 days.

(21) Appl. No.: 09/932,688

(22) Filed: Aug. 16, 2001

(51) Int. Cl.[7] ............................................... A01K 97/10
(52) U.S. Cl. ........................................ 43/21.2; 248/538
(58) Field of Search ......................... 43/21.2; 248/511, 248/518, 534, 538, 540

(56) References Cited

U.S. PATENT DOCUMENTS

| | | | | |
|---|---|---|---|---|
| 416,755 | A | * 12/1889 | Schoenike | 248/540 |
| 3,074,674 | A | * 1/1963 | Hill | 248/538 |
| 3,246,865 | A | * 4/1966 | Latimer | 43/21.2 |
| 3,708,141 | A | * 1/1973 | Friedgen et al. | 248/540 |
| 3,783,547 | A | * 1/1974 | Bystrom et al. | 43/21.2 |
| 3,992,798 | A | * 11/1976 | Schmitt, Sr. | 43/21.2 |
| 4,064,811 | A | * 12/1977 | Copeland | 43/21.2 |
| 4,235,409 | A | * 11/1980 | Cummings | 248/538 |
| 4,297,963 | A | * 11/1981 | Beacom | 114/218 |
| 5,120,016 | A | * 6/1992 | Dysarz | 43/21.2 |
| 5,210,971 | A | * 5/1993 | Efantis | 43/21.2 |
| 5,560,137 | A | * 10/1996 | Herring | 43/21.2 |
| 5,566,495 | A | * 10/1996 | Kim et al. | 43/21.2 |
| 5,632,112 | A | * 5/1997 | Steinborn | 43/21.2 |
| 5,662,306 | A | * 9/1997 | Dysarz | 43/21.2 |
| 5,813,163 | A | * 9/1998 | Dysarz | 43/21.2 |
| 5,967,075 | A | * 10/1999 | Johansen | 43/21.2 |

FOREIGN PATENT DOCUMENTS

DE          19707904      * 9/1998

* cited by examiner

Primary Examiner—Darren W. Ark
(74) Attorney, Agent, or Firm—Joseph N. Breaux

(57) ABSTRACT

A rod and reel holder for use on fishing piers is provided that includes a mechanism for securing the rod holder between the planks of the fishing pier that include a lower retaining member and an upper retaining member that are compressed together by a spring.

1 Claim, 1 Drawing Sheet

PIER REEL HOLDER

DESCRIPTION

Technical Field

The present invention relates to fishing accessories and more particularly to a rod and reel holder for use on the edge of a fishing pier which includes a mechanism for securing the device between the planks of the fishing pier.

BACKGROUND OF INVENTION

It is often enjoyable to fish from a fishing pier constructed from a number of boards which are supported by a frame and attached in a spaced relationship such that there is a gap between each of the boards. Because there is a gap between each of the boards it can be possible to support a fishing rod holder which utilizes a mechanism which is insertable between the gap and which can provide an attachment mechanism for supporting the fishing rod holder in a variety of locations along the pier.

SUMMARY OF INVENTION

It is therefore an object of the invention to provide a pier fishing reel holder that includes a mechanism for securing the fishing reel holder using the gap between the boards forming the fishing pier.

Accordingly, a pier reel holder is provided that includes a small metal or plastic tubular housing closed on one end and opened on the other. A long bolt extends through the housing and would have a knob affixed to the top and a welded retainer bar approximately ⅜ of an inch wide and three inches long at the bottom. A round upper retaining plate approximately three inches in diameter with a center mounted hole would be mounted onto the bolt above the lower retainer. A coil spring is mounted between the upper retainer plate and the top of the housing interior. In use the upper retainer plate is allowed to slide up the bolt and compress the coil spring. When at rest the spring forces the retainer tightly together. A folding piece of plastic or metal rod holder is mounted to the top of the housing. The rod holder would reform the shape of a U with an enclosed circular band with a rounded end cap at the bottom allowing the lower handle of a rod or reel to be inserted and held in place. When not in use, the rod holder would swivel up and over the top of the main assembly as to fold compactly for storage. In use, the user would simply insert the narrow lower retainer of the pier reel holder between the two blanks of the pier. Next, the user would push down compressing the spring and rotate the assembly so that the lower retainer is rotated 90 degrees and each end of the retainer contacts a separate blank. The spring then forces the upper retainer plate down creating a force sufficient to hold the reel holder in place.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY EMBODIMENTS

Figure 1:
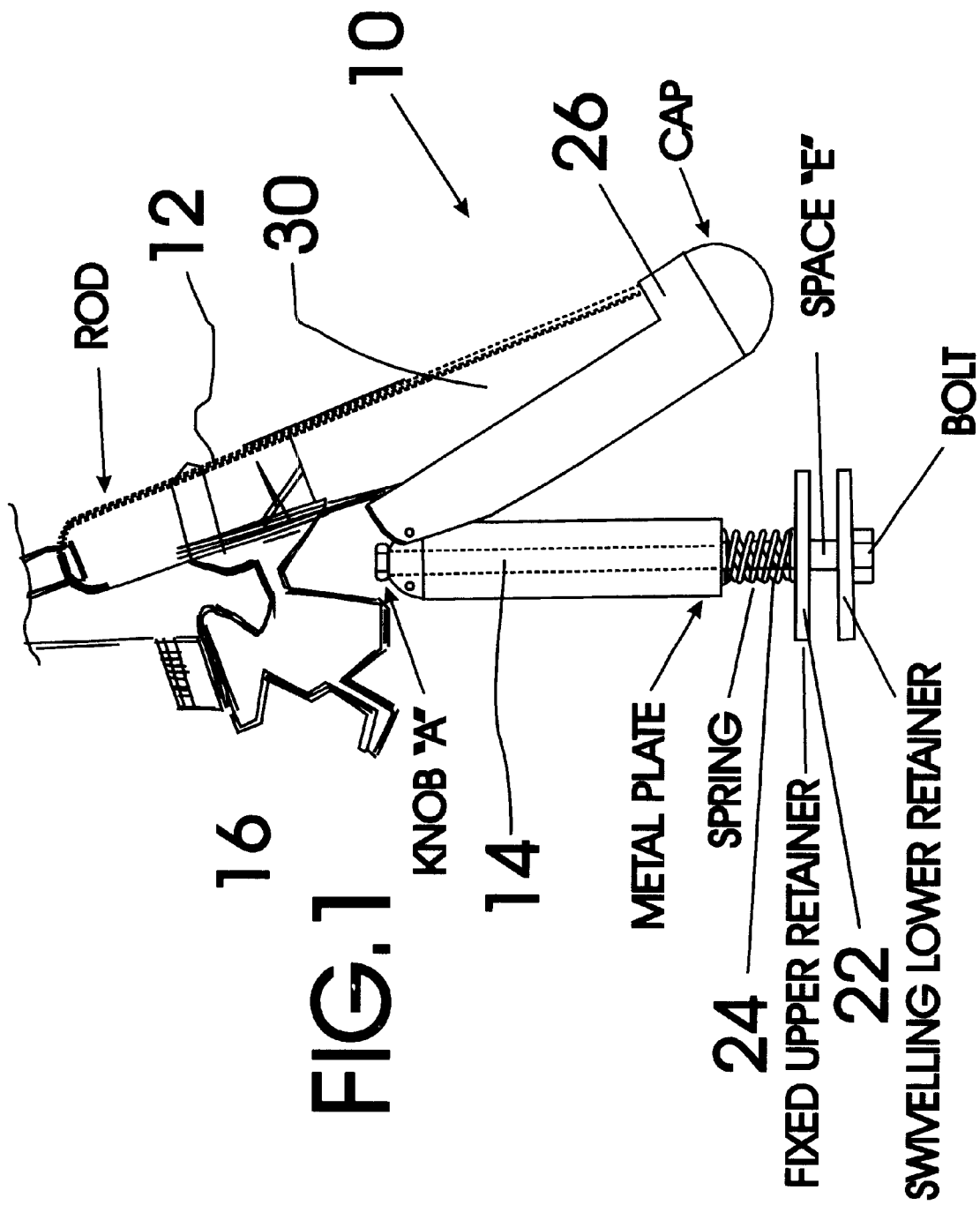
FIG. 1 shows an exemplary embodiment of the invention in use with a representative fishing rod.

FIG. 1 shows a pier reel holder of the present invention generally designated 10 in use with a representative fishing rod 12. Pier reel holder 10 includes a tubular housing, generally designated 14; a long bolt, generally designated 16; a round upper retaining plate, generally designated 18; a coil spring, generally designated 20; and a rod holder assembly, generally designated 22. Tubular housing 14 having a top bolt passage opening 24 through a top housing end 26 and a bottom bolt passage opening 28 through a bottom housing end 30.

Long bolt 16 extends through housing 14 and having a knob 32 affixed to a top-bolt end 34 and a welded retainer bar 36 affixed at a ninety-degree angle with respect to a shaft portion 38 of a bottom bolt end 40.

Round upper retaining plate 18 has a center mounted hole 44 and is slidably mounted on the shaft portion 38 of bottom bolt end 40 between welded retainer bar 36 and the bottom housing end 30.

Coil spring 20 is mounted on shaft portion 38 between upper retainer plate 18 and bottom housing end 30.

Rod holder assembly 22 including a channel-shaped portion, generally designated 50 terminating at one end 52 in a semi-spherical, rod butt receiving cap 54 and at the other end in a pivoting connection 60 with the top housing end 26.

When not in use, rod holder assembly 22 pivots over and receives a portion of the housing 14. It can be seen from the preceding description that a pier reel holder has been provided.

It is noted that the embodiment of the pier reel holder described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A pier rod and reel holder comprising:
    a tubular housing having a top bolt passage opening through a top housing end and a bottom bolt passage opening through a bottom housing end;
    a long bolt extending through the housing, the top bolt passage opening, and the bottom bolt passage opening and having a knob affixed to a top bolt end and a welded retainer bar affixed at a bottom bolt end;
    a round upper retaining plate with a center mounted hole slidably mounted on the bottom bolt end between the welded retainer bar and the bottom housing end;
    a coil spring mounted between the upper retainer plate and the bottom housing end; and
    a rod holder assembly including a channel-shaped portion terminating at one end in a rod butt receiving cap and at the other end in a pivoting connection with the top housing end.

* * * * *